United States Patent
Dey

(10) Patent No.: US 8,843,539 B2
(45) Date of Patent: Sep. 23, 2014

(54) GENERATION OF SEED VALUE FOR PSEUDO RANDOM NUMBER GENERATOR

(75) Inventor: Eric Dey, Austin, TX (US)

(73) Assignee: Caringo, Inc., Austin, TX (US)

( * ) Notice: Subject to any disclaimer, the term of this patent is extended or adjusted under 35 U.S.C. 154(b) by 281 days.

(21) Appl. No.: 13/466,974

(22) Filed: May 8, 2012

(65) Prior Publication Data

US 2013/0304781 A1     Nov. 14, 2013

(51) Int. Cl.
*G06F 7/58*     (2006.01)

(52) U.S. Cl.
USPC .......................................... 708/254

(58) Field of Classification Search
CPC ......... G06F 7/582; G06F 7/588; G06F 7/584; H04L 9/22; H04B 1/7143
USPC .......................................... 708/254
See application file for complete search history.

(56) References Cited

U.S. PATENT DOCUMENTS 6,816,992 B2*  11/2004  Eby .............................. 714/739
2011/0066670 A1*  3/2011  Yu ................................ 708/252

* cited by examiner

*Primary Examiner* — Tan V. Mai
(74) *Attorney, Agent, or Firm* — Beyer Law Group LLP

(57) ABSTRACT

Two or more numerical samples are read from a storage location (or many storage locations) and the samples are compared to generate a single bit of entropy. This method is repeated to populate two arrays which are also compared to generate a single bit. Comparison of the arrays is also repeated to generate a sequence of bits which are formed into computer words. The words are combined with a shift register to generate a seed block array of any length. The seed block array is used to seed a pseudo random number generator. The storage location is a register, accumulator, buffer, clock, address, memory location, etc., that changes periodically. Comparison may be performed by counting the number of certain types of bits in the two values and returning a one or zero depending upon the count.

29 Claims, 7 Drawing Sheets

Generate Single Bit of Entropy

Generate Single Bit of Entropy

Generate Filtered Bit of Entropy

Create a Word of Entropy

Create a Seed Block

Seed a Pseudo Random Number Generator

GENERATION OF SEED VALUE FOR PSEUDO RANDOM NUMBER GENERATOR

FIELD OF THE INVENTION

The present invention relates generally to random number generation. More specifically, the present invention relates to generation of seed values for pseudo random generators.

BACKGROUND OF THE INVENTION

As is known in the art, random numbers may be generated using so-called "true" random number generators and pseudo random number generators. The true random number generators are typically based upon measurement of a physical phenomenon, which measurement is then processed to produce a random number. Examples include measurement of a roulette wheel (the RAND tables), thermal noise of an electron tube, difference in charges between two capacitors, movements of a hard disk drive, radio noise, human behavior, etc. A pseudo random number generator uses a computational algorithm to produce long runs of random numbers, and these generators use a numerical seed value in order to generate numbers.

When using pseudo random number generators (PRNG), generation of the seed is important to ensure independence and non-repeatability, especially for PRNGs executing on distributed processes, include those executing on different computing hardware. The concept of "independence" means independence from time, location, and other attributes of the computing hardware which is important to avoid weakness in the production of PRNG seeds and to avoid the possibility of creating the same or similar seed values on different computing hardware devices by accident or by engineered, deliberate means.

The concept of "non-repeatability" means that a PRNG will not be seeded with the same value even when attempts are made to duplicate all of the initial starting conditions on the computing hardware. The concept of "numerical dispersion" is also important in order to provide uniformly distributed input values for the PRNG seed in order to guard against input seed values that can be guessed or that are computationally predictable. Inferior seed generation techniques can produce seed values that are non-uniform and that even have localized groupings of values that can be exploited.

While efforts have been made in the past provide robust generation of seed values for pseudo random number generators, many of these methods are insufficient at providing independence and numerical dispersion. For example, seeds derived from host computer calendar and clock values, and seeds derived from attributes of the host computer can be insufficient. Attributes of the host computer that have been used include: CPU identification number, network interface controller addresses (MAC addresses), hardware component identification numbers, and other characteristics of installed hardware or running processes.

Given the insufficiency of current methods for generating seed values, an improved technique for generation of seed values for pseudo random number generators is desirable.

SUMMARY OF THE INVENTION

To achieve the foregoing, and in accordance with the purpose of the present invention, a technique is disclosed that generates seed values for pseudo random number generators that is superior to prior art techniques.

In particular, the present invention provides PRNG seeds that are independent of time, location, and physical attributes of the computing hardware and is a suitable for any PRNG algorithm which uses a seed as input. Additionally, embodiments of the invention produce PRNG seeds that are highly dispersed numerically across the PRNG's range of input seed values.

The present invention has a variety of advantages. For one, it is independent from known (and thus guessable or configurable) attributes of the computing hardware. It can utilize the entire numerical range available for the PRNG input seed and can disburse the seed value uniformly across the numerical range. The invention also provides for seed input values from an arbitrarily small or large range of possible input values and can produce different, non-repeatable seed values under the same initial starting conditions of the computing hardware.

Furthermore, the invention is especially suited for a variety of computer hardware. For one, the invention produces unique seed values on multiple computing hardware devices that have precisely synchronized time-of-day clocks. The invention may be used on general purpose computing hardware from a wide range of manufacturers and may be used on computing hardware having differing word sizes, e.g., 32-bit, 64-bit, 128-bit, etc. architectures. In addition, the invention does not rely on computing hardware or operating system attributes that can be identical on different computing hardware, and does not rely on specialized true random number generator hardware.

The invention is also independent of the software used. The invention may be used on virtualized computing hardware, may be used on different operating systems executing on computing hardware, and guards against highly predicable code execution timing on time-sharing and non-time-sharing operating systems.

In certain embodiments, the present invention uses a multiple sampling technique in order to guard against localized execution phenomena and to create filtered output, uses a whitening function to eliminate bias toward '0' or '1' bit values, and may uses a linear shift feedback register in order to cause chained interactions across collected words of entropy.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

In general, the technique obtains samples using the host computer's time of day clock or other memory location within the computer. These samples are then used to create entropy bits that will be aggregated into a larger seed input value for a pseudo random number generator.

Any suitable computing device may be used for the host computer including server computers, rack-mounted computers, desktop computers, laptop computers, mobile telephones, etc. The clock of the host computer may be any suitable timekeeping device or software routine executing on the CPU of the host computer.

In addition, it is not strictly necessary to use a clock of the computer to obtain the samples. Any storage location of the computer (e.g., in random access memory proper, in a CPU, buffer, network interface card, controller, bus,) whether it is a register, accumulator, variable, etc., may be sampled by the present invention in order to obtain samples for comparison as described below. In fact, it is not necessary to obtain the two samples from the same storage location. For example, the first sample may be obtained from a register in the CPU while the second sample may be obtained from a particular buffer in input/output hardware. It is preferable that the values in any storage location sampled change periodically such that the next time that storage location is sampled its value will be different. Even more preferable is a storage location whose value changes very rapidly, ranging from a few hertz up to Mega or Giga hertz, thus permitting the technique of the present invention to generate seeds more rapidly. Accordingly, a clock of the computer is a desirable storage location used for sampling because its value changes from one sample to the next and, these values change very rapidly, on the order of a computer clock frequency.

Figure 1:
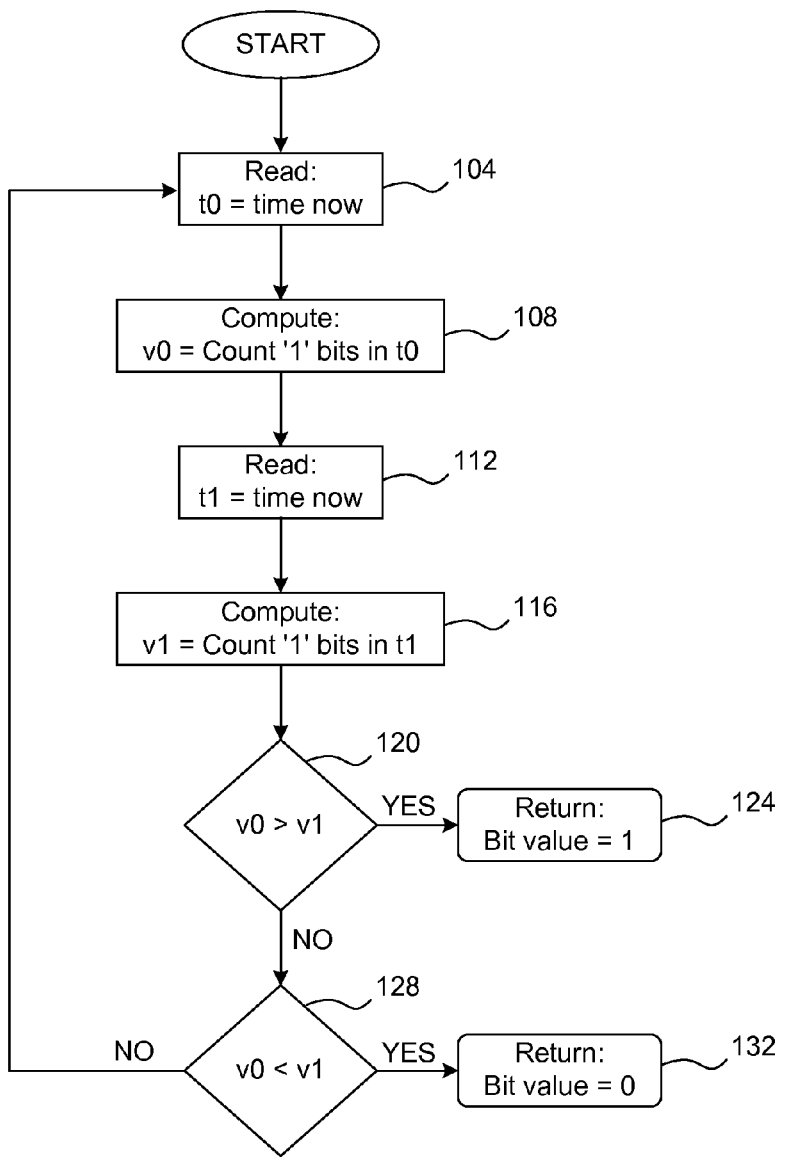
FIG. 1 is a flow diagram describing one embodiment by which a single bit of entropy is generated.

Nevertheless, other suitable storage locations may also be used to provide the samples used in FIG. 1. For example, the microphone input of a computer may also be used to produce an input value that can be digitized. Reading a digitized input from a microphone will produce a similar effect as sampling a clock, especially if the input is changing rapidly, such as on the order of a computer clock frequency. Indeed, any other suitable computer input such as a camera lens (or other light input) or accelerometer than can be digitized may be used.

Generate Single Bit of Entropy

FIG. 1 is a flow diagram describing one embodiment by which a single bit of entropy is generated. In order to generate a source for this single bit of entropy, a method samples pairs of values from a clock, for example; for each pair, the method compares the count of "1" bits in the two results. These counts are stored into accumulators, and, depending upon which accumulator is greatest, either a "1" or a "0" bit is created. A whitening function may also be used to avoid bias toward a particular bit value.

In step 104 a first value is read from a clock within the host computer. As mentioned above, any suitable clock or similar timekeeping device of a computer may be used, and the value need not necessarily come from the clock. In step 108 the method counts the number of "1" bits in the binary representation of the first value and stores this first count value in an accumulator or other suitable storage area of the computer (hardware, software, etc.).

In step 112 a second value is read from the clock within the host computer. As mentioned above, any suitable clock or similar timekeeping device of a computer may be used as well as any other suitable storage location. The second value may be read from a different location than from where the first value is read. In step 116 the method counts the number of "1" bits in the binary representation of the second value and stores this second count value in another accumulator or other suitable storage area of the computer.

In an embodiment where the first or second values are read from a storage location that may not change relatively rapidly compared to the speed of execution of the loop of FIG. 1, and extra comparison may be added to steps 104 and 112 in order to determine if the new value read from that storage location is the same as the previous value read. If so, then the new value is discarded and another value is read until it is different. A slight delay may be programmed into this method to make sure that the values do change. If a single storage location is read (such as using the clock of the computer) than the value read is compared to the previous value read. But, if two different storage locations are used (i.e., one for the first value and the second for the second value), then a new value read from the first storage location would be compared to the previous value read from that first storage location and a new value read from the second storage location would be compared to the previous value read from that second storage location.

Step 120 determines whether the first count value is greater than the second count value. If so, then in step 124 the method returns a bit value of "1." If not, step 128 determines whether the first count value is less than the second count value. If so, then in step 132 the method returns a bit value of "0." If not (i.e., the count values are equal) then no bit value is output and control returns to beginning of the method in order to generate new values for comparison.

Even though FIG. 1 has described a method in which the number of "1" bits are counted and compared, the invention works equally well if the number of "0" bits are counted and compared. And, steps 120 and 128 may be substituted for one another. Of course, steps 124 and 132 may also return the opposite bit values from what is presently shown.

Furthermore, other techniques may be used to compare the first value and the second value in order to determine whether to output a "1" bit or a "0" bit. For example, the values may be compared by determining which is larger (or smaller) than the other. Or, the presence (or absence) or length of runs of "1s" or "0s" in the two values may be compared. Other techniques for comparing these two values in order to generate a single bit of entropy may be used. In fact, more than two values may be sampled and these values may be compared in any fashion to generate a single bit of entropy.

As mentioned, a whitening function may also be used to avoid bias toward a particular bit value. This may be performed by returning to step 104 after step 128 when the two values have the same number of "1" bits.

The method may be repeated any number of times to generate any number of bits, thus forming a sequence of entropy bits.

Generate Filtered Bit of Entropy

In order to use multiple samples and to prevent local non-random phenomena, e.g., similar timer samples over a short period, the process may also use a method of creating a filtered bit of entropy. The method does this by creating a pair of arrays using the single bit entropy samples from FIG. 1. The counts of the number of "1" bits in these arrays are then stored into two accumulators and then compared in order to produce a filtered bit of entropy. A whitening function may be used again in order to prevent bias toward a particular bit value. The method of FIG. 2 is not strictly necessary but is desirable to prevent these non-random phenomena.

Figure 2:
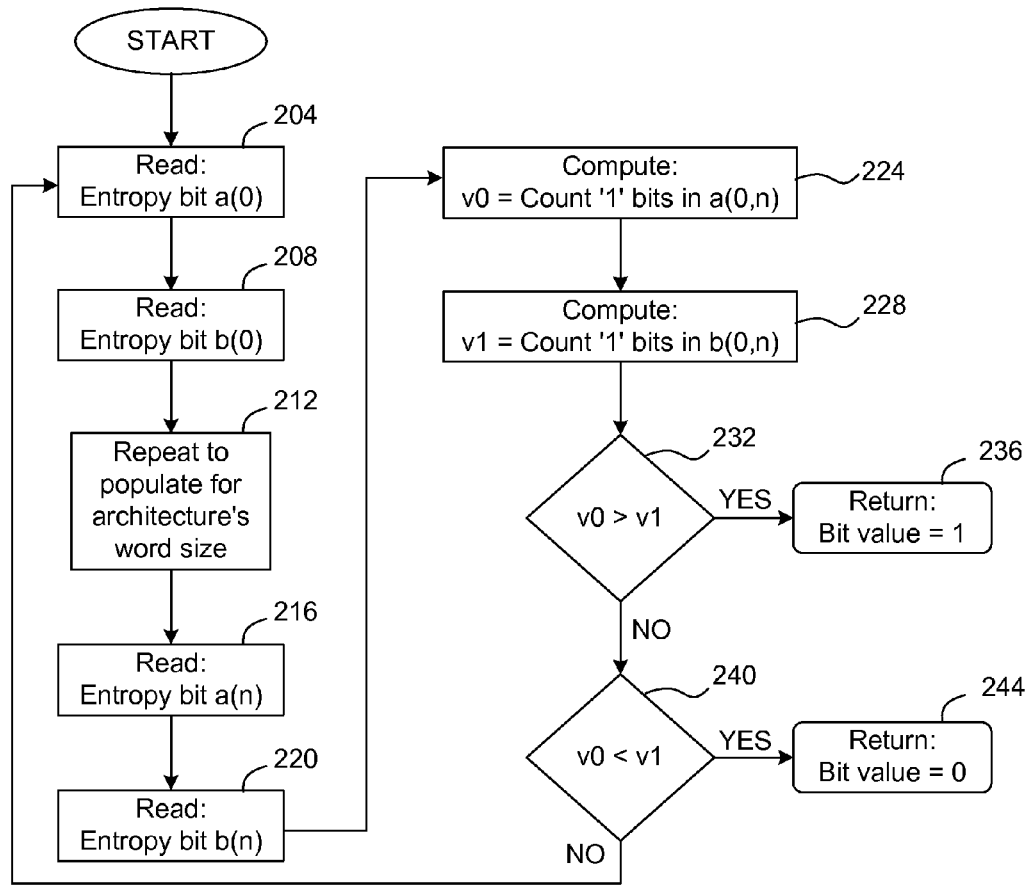
FIG. 2 is a flow diagram describing one embodiment by which a filtered bit of entropy is generated.

FIG. 2 is a flow diagram describing one embodiment by which a filtered bit of entropy is generated. As mentioned, this method of filtering uses two arrays each storing a set of the entropy bits generated in FIG. 1. Any type of data structure may be used to store these sets of entropy bits (not limited to an array), each structure may be of any length, and the entropy bits may be read from the output of FIG. 1 and stored into these data structures in a variety of manners. For example, the output from FIG. 1 may be used to first fill the first array a(n) and then the output may be used to fill the second array b(n). Or, every other bit from the output may be used to fill the first array and the intervening bits used to fill the second array. Other schemes may also be devised. In addition, instead of storing the entropy bits into two arrays, the values of the bits may be identified and counted as they are generated (as if two arrays are being filled), and the accumulators filled in that fashion. The below steps present one particular embodiment for generating the filtered bit.

In step 204 a single bit of entropy is read from the output of FIG. 1 and stored into the first position of the first array a(0). In step 208 the next bit of entropy is read and stored into the first position of the second array b(0). Step 212 indicates that these steps are repeated in order to populate each array according to the word size of the particular computer architecture being used, e.g., 16-bit, 32-bit or 64-bit. Of course, each array need not necessarily be the length of the word size, but this is preferable.

Steps 216 and 220 indicate that bits are read into each array until each array is filled. Next, in step 224 the number of "1" bits in the first array are counted and stored into a suitable memory location such as into an accumulator. In step 228 the number of "1" bits in the second array are counted in stored into another suitable memory location. Step 232 compares these two counts. If the value in the first accumulator is greater than the value in the second accumulator then in step 236 a bit value of "1" is returned. On other hand, step 240 determines whether the value in the first accumulator is less than the value in the second accumulator; if so, then in step 244 a bit value of "0" is returned. If the two values are equal then control returns to step 204 in order to read new entropy bit values into the two arrays.

Thus, two sequences of entropy bits generated from FIG. 1 are filtered in order to produce a single filtered bit of entropy as the output of FIG. 2. A whitening function may also be used by returning to step 204 after step 240 if the two values are equal.

Even though FIG. 2 has described a method in which the number of "1" bits are counted and compared, the invention works equally well if the number of "0" bits are counted and compared. And, steps 232 and 240 may be substituted for one another. Of course, steps 236 and 244 may also return the opposite bit values from what is presently shown.

The method may be repeated any number of times to generate any number of filtered bits, thus forming a sequence of filtered entropy bits.

Generate Word of Entropy

The process then assembles the filtered entropy bits into larger integers. In step 304 a filtered entropy bit from the output of FIG. 2 is read into the first position of a data structure such as an array w. Step 308 indicates that subsequent filtered entropy bits are read into this array in order to populate the array according to the word size of the computer architecture. In step 312 the final filtered entropy bit is read into the last position of the array. In step 316 this array of filtered entropy bits is returned to the process as a word of entropy. Thus, a sequence of filtered entropy bits from the output of FIG. 2 is used to form a word of random bits. Any number of words may be generated in step 316 using the sequence of filtered entropy bits as shown.

Create Seed Block

Once any number of words of random bits have been generated, these words may be used to generate a seed block for use in the pseudo random number generator. These generated words may be used to directly populate a seed block array for use in seeding a pseudo random number generator. While optional, it may also be desirable to implement the techniques of FIG. 4 and FIG. 5 in order to further scramble the bits in order to eliminate non-random local phenomena. For example, a linear feedback shift register may also be combined with these integer values to produce a seed block whose size is a configurable.

Figure 4:
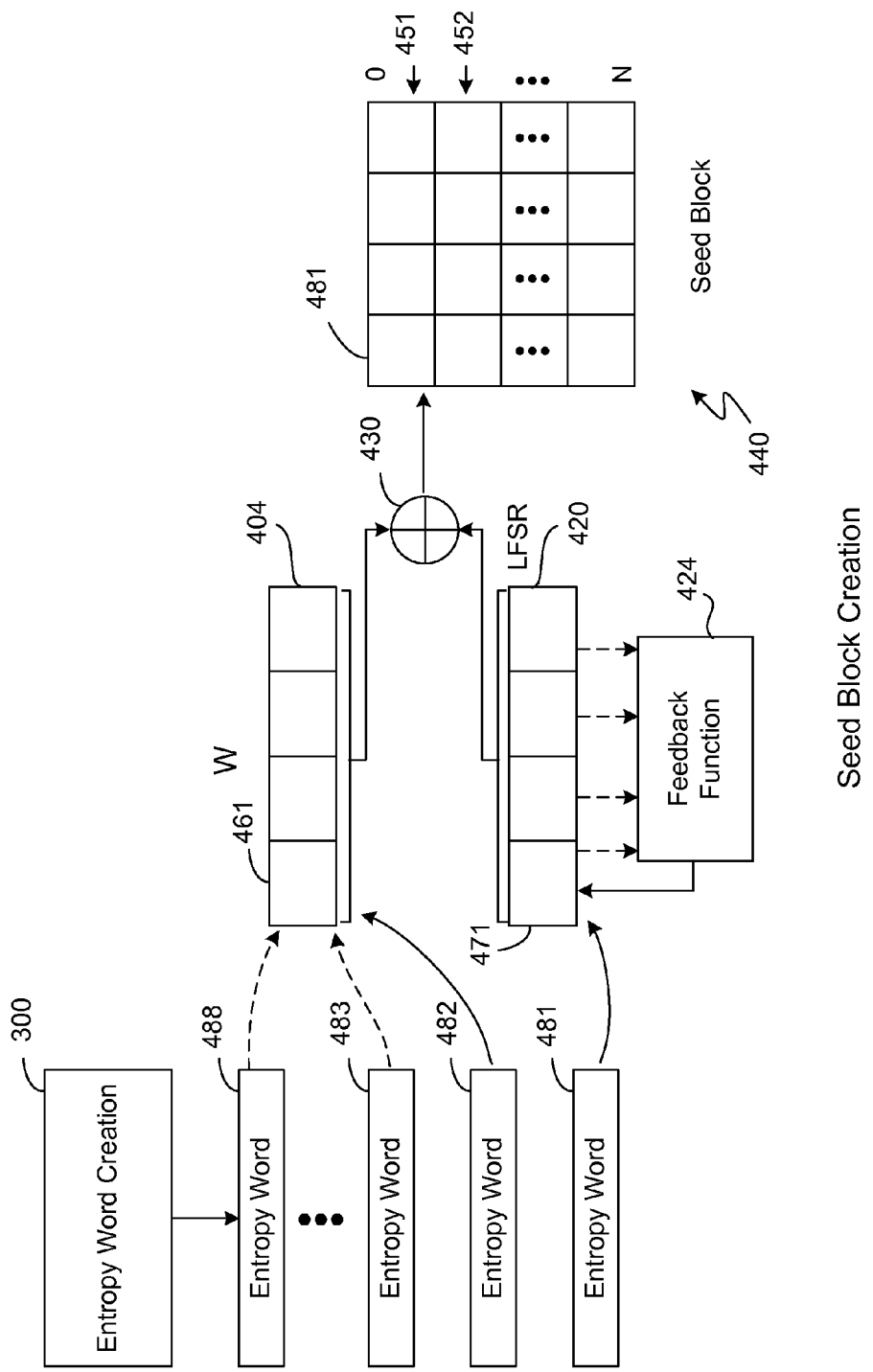
FIG. 4 is a block diagram illustrating one embodiment by which a seed block may be created.

FIG. 4 is a block diagram illustrating one embodiment by which a seed block may be created. As shown, the contents of a word W 404 are combined with the contents of a linear feedback shift register (LFSR) 420 to produce a seed block of any size 440.

Figure 3:
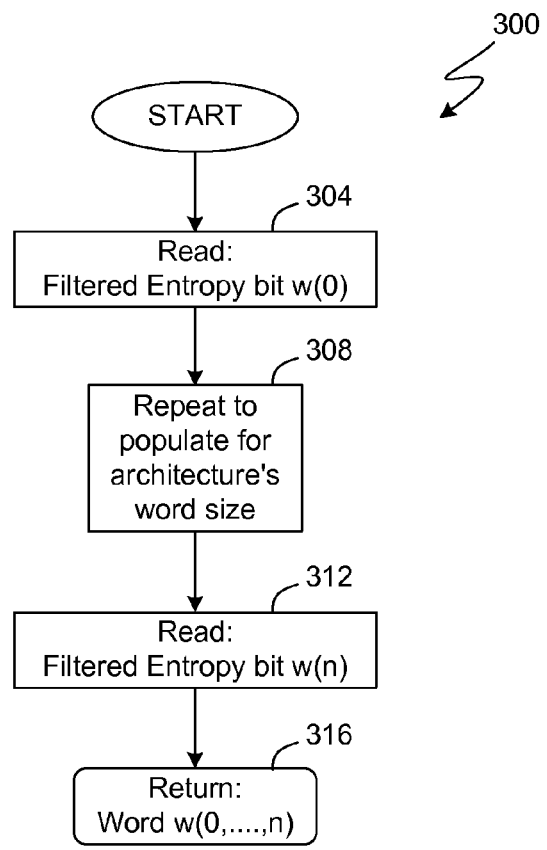
FIG. 3 illustrates entropy word creation.

In operation, the entropy word creation method 300 of FIG. 3 is used to generate a stream of any number of entropy words 481-488. One of the entropy words 481 is used to seed the shift register while a second entropy word 482 is used as the initial value for word W. The contents of both the shift register and the word W are combined using an XOR function 430 to generate the first word 451 of the seed block. Once a word of the seed block has been generated, the word W is replaced with the next entropy word 483, the shift register is updated, and another iteration is performed in order to generate the next word in the seed block 452. Any number of these iterations may be performed in order to create the seed block array having a configurable length N. In one specific embodiment, the exclusive or operation between word 404 and shift register 420 is performed by an exclusive or between corresponding bits. For example, bit 461 is combined with bit 471 in order to generate bit 481. Succeeding bits in the word of the seed block are generated using corresponding bits from word 404 and shift register 420.

As known in the art, a feedback shift register typically includes two parts, the shift register itself 420 and the feedback function 424. On each update, the least significant bit of the shift register is shifted out and a new bit is shifted into the most significant bit position. The new bit is generated using a feedback function 424 which takes as input any of the bits within the shift register. The present invention may utilize any type of feedback shift register. In a specific embodiment, the invention uses a linear feedback shift register which means that the feedback function is simply the XOR of certain bits in the shift register (the tap sequence).

In fact, it is not strictly necessary to combine the entropy word 404 with the shift register using an XOR function 430. Another function may also be used. In fact, the entropy word may also be combined with another bit sequence in order to create the seed block, rather than using the shift register.

Figure 5:
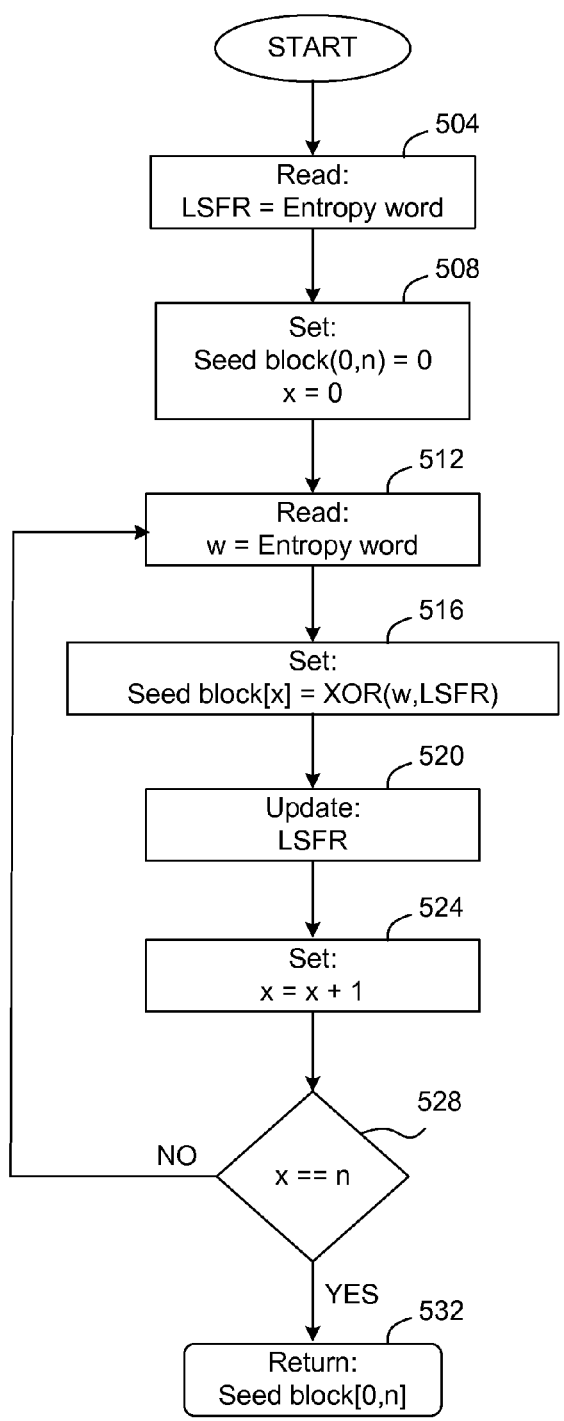
FIG. 5 is a flow diagram describing more detailed operation of the seed block creation.

FIG. 5 is a flow diagram describing more detailed operation of the seed block creation. In step 504 the first entropy word 481 from flow 300 is entered into register 420 as a seed. In step 508 the seed block 440 is initialized to zeros and its array pointer, x, is also set to zero. Next, in step 512 the next entropy word 482 is read into word W, 404. Or, any subsequent entropy word may be used in order to seed register 424 or to fill word 404. In other words, it is possible to discard entropy words, although it is preferable to use them in the order in which they are created.

Next, in step 516 the first word of seed block 440 will be determined using an operation between word 404 and shift register 420. In this embodiment, an XOR 430 is performed between word 404 and register 420 in order to generate the first word 451 of the seed block array.

In step 520 the linear feedback shift register is updated by first inputting any of the relevant tap bits into the feedback function 424 and then shifting each bit in the register to the right. The most significant bit of the shift register will then be replaced by the output of the feedback function.

Next, in step 524 the value of the pointer x is increased by one such that the next word will be generated in the seed block. In step 528 it is determined if all of the words in the seed block have been generated. If not, then control returns to step 512 where the next word of entropy 483 is read into storage location W 404. The method then repeats itself by combining word 404 with the shift register in order to generate the next word in the seed block.

In step 528 if all of the words in the seed block have been determined, then in step 532 the completed seed block array 440 is returned.

As mentioned above, it is not strictly necessary to combine the generated words 481-488 with a shift register to produce the seed block. For example, steps 504, 516 and 520 may be eliminated in order to generate the seed block array.

Generate Pseudorandom Number

Once the seed block has been created, it may then be input into a pseudorandom number generator for generation of a random number.

Figure 6:
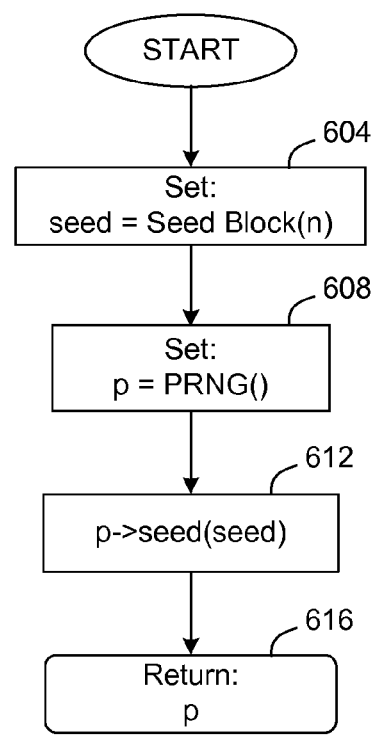
FIG. 6 is a flow diagram describing one embodiment by which a pseudo random number generator is seeded.

FIG. 6 is a flow diagram describing one embodiment by which a pseudo random number generator is seeded. In step 604 the function "Seed Block" is called with a variable N in order to generate a seed block array having a size of N. In other words, a seed block array will be generated having N number of words, each word preferably having a length equivalent to the word size of the computer. This step may be performed using the technique discussed in FIG. 5. The resultant seed block array is assigned to the variable "seed." Any size of seed block array desired may be created and used.

In step 608 an instance of any suitable pseudo random number created and is assigned to the variable "p." Any suitable pseudorandom number generator may be used. In step 612 the pseudorandom number generator is seeded using the input seed block array. In other words, the state of the pseudo random number generator is initialized using the seed block array. In step 616 the seeded pseudorandom number generator is returned for use and may be used to generate a random number. Accordingly, the pseudorandom number generator may be called to generate a random number.

Computer System Embodiment

Figure 7A:
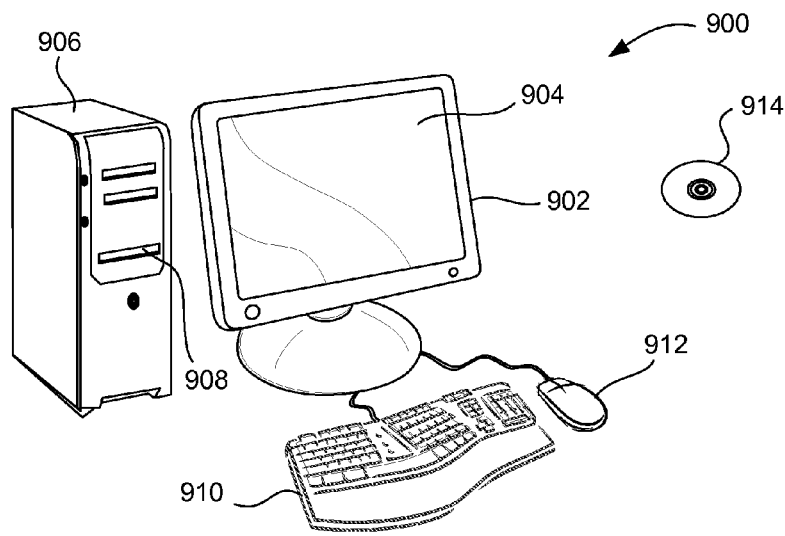
FIGS. 7A and 7B illustrate a computer system suitable for implementing embodiments of the present invention.
Figure 7B:
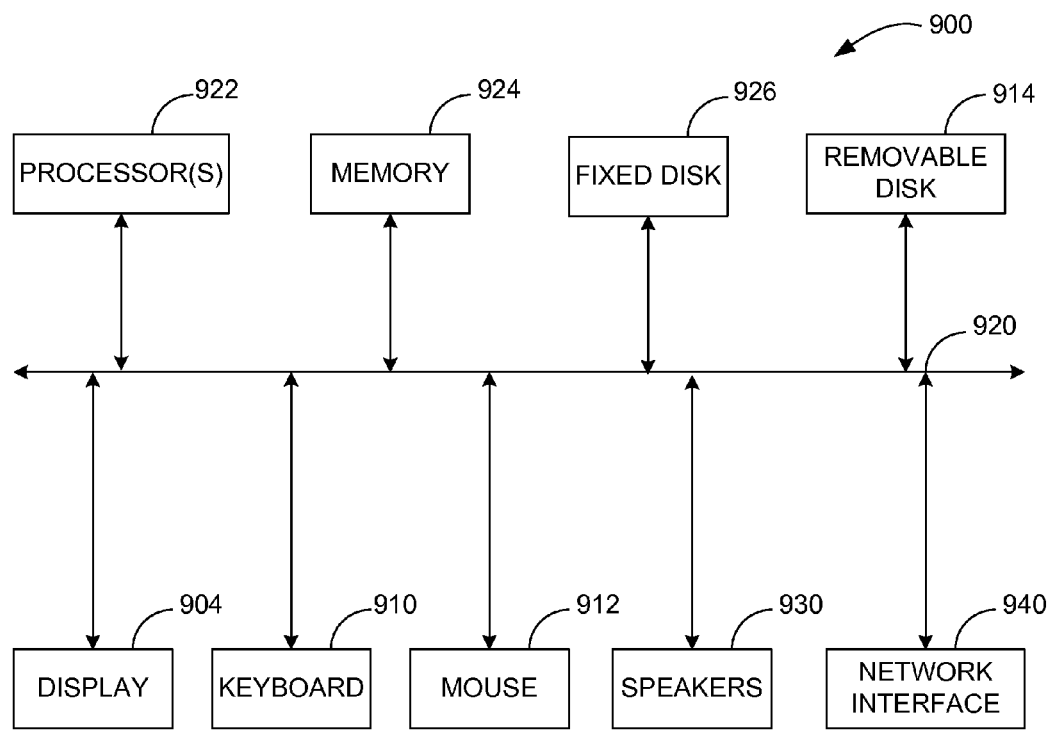

FIGS. 7A and 7B illustrate a computer system 900 suitable for implementing embodiments of the present invention. FIG. 7A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 7B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

I claim:

1. A method of generating a word of random bits in a computer, said method comprising:
    reading a first value from a first storage location in a computer;
    reading a second value from a second storage location and said computer;
    comparing said first and second values to produce a single bit;
    repeating said first, second and third steps to create a sequence of bits; and
    forming said sequence of bits into said word of random bits.

2. The method as recited in claim 1 wherein said first storage location and said second storage location are the same location.

3. The method as recited in claim 1 wherein the values in said first storage location and in said second storage location periodically change.

4. The method as recited in claim 1 further comprising:
    inputting said word of random bits as a seed value in a pseudo random number generator.

5. The method as recited in claim 4 further comprising:
    generating a random number using said pseudo random number generator.

6. The method as recited in claim 1 further comprising:
    comparing said first and second values by counting the number of certain types of bits in said first and second values.

7. The method as recited in claim 1 wherein the values in said first and second storage locations change on the order of a frequency of a clock in said computer.

8. The method as recited in claim 1 wherein the values in said first and second storage locations are derived from a clock of said computer.

9. The method as recited in claim 1 wherein the values in said first and second storage locations are derived from an input sensor of said computer.

10. The method as recited in claim 1 wherein said first storage location and said second storage location are the same location, wherein values in said first storage location periodically change, and wherein said first and second values are different.

11. A method of generating a block of words in a computer, said method comprising:
    successively reading two values from a location in said computer that are different;
    comparing said two values that are different and generating a single bit;
    repeating said first and second steps to create a computer word of said single bits; and
    repeating said first, second and third steps to create a plurality of computer words; and
    outputting said plurality of computer words as said block of words.

12. The method as recited in claim 11 wherein the values in said location periodically change.

13. The method as recited in claim 11 further comprising:
    inputting said block of words as a seed value in a pseudo random number generator.

14. The method as recited in claim 13 further comprising:
    generating a random number using said pseudo random number generator.

15. The method as recited in claim 11 further comprising:
    comparing said values by counting the number of certain types of bits in said values.

16. The method as recited in claim 11 wherein the values in said location change on the order of a frequency of a clock in said computer.

17. The method as recited in claim 11 wherein the values in said location are derived from a clock of said computer.

18. The method as recited in claim 11 wherein the values in said location are derived from an input sensor of said computer.

19. A method of generating a seed value, said method comprising:
    reading a plurality of values from storage locations in said computer, each of said values being different from the other values;
    comparing bits in said plurality of values that are different to generate a single bit;
    repeating said reading and comparing to create a sequence of single bits;
    forming a plurality of computer words using said sequence of single bits;
    outputting said plurality of computer words as said seed value.

20. The method as recited in claim 19 wherein said storage locations are the same location.

21. The method as recited in claim 19 wherein said values periodically change.

22. The method as recited in claim 19 further comprising:
    inputting said seed value into a pseudo random number generator.

23. The method as recited in claim 22 further comprising:
    generating a random number using said pseudo random number generator.

24. The method as recited in claim 19 further comprising:
    comparing said bits by counting the number of certain types of bits in said values.

25. The method as recited in claim 19 wherein said values change on the order of a frequency of a clock in said computer.

26. The method as recited in claim 19 wherein said values are derived from a clock of said computer.

27. The method as recited in claim 19 wherein said values are derived from an input sensor of said computer.

28. The method as recited in claim 19 wherein each of said values is read from one of said storage locations.

29. The method as recited in claim 19 wherein said storage locations are the same location, wherein values in said same storage location periodically change, and wherein said plurality of values are different.

* * * * *